(12) United States Patent
Sitnikov

(10) Patent No.: US 9,044,670 B2
(45) Date of Patent: *Jun. 2, 2015

(54) USING INPUT FROM A POINTING DEVICE TO CONTROL A SIMULATED OBJECT

(71) Applicant: Wargaming.net LLP, Walthamstow (GB)

(72) Inventor: Anton Sitnikov, Minsk (BY)

(73) Assignee: Wargaming.net LLP, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/139,055

(22) Filed: Dec. 23, 2013

(65) Prior Publication Data
US 2014/0113721 A1 Apr. 24, 2014

Related U.S. Application Data

(63) Continuation of application No. 13/645,882, filed on Oct. 5, 2012, now Pat. No. 8,641,526.

(51) Int. Cl.
*A63F 9/24* (2006.01)
*A63F 13/00* (2014.01)
*A63F 13/803* (2014.01)
*A63F 13/422* (2014.01)
*A63F 13/537* (2014.01)
*A63F 13/67* (2014.01)

(52) U.S. Cl.
CPC .............. *A63F 13/005* (2013.01); *A63F 13/803* (2014.09); *A63F 13/422* (2014.09); *A63F 13/537* (2014.09); *A63F 13/67* (2014.09)

(58) Field of Classification Search
CPC ................ A63F 2300/8076; A63F 2300/6676; A63F 13/04; G09B 9/12; G09B 9/08

USPC ....................................................... 463/31, 37
See application file for complete search history.

(56) References Cited

U.S. PATENT DOCUMENTS

| 6,126,545 A | 10/2000 | Takahashi et al. |
| 6,234,901 B1 | 5/2001 | Nagoshi et al. |
| 6,540,612 B1 | 4/2003 | Miyamoto et al. |

(Continued)

OTHER PUBLICATIONS

Google Maps, "Introducing smart navigation in Street View: double-click to go (anywhere!)," http://google-latlong.blogspot.com/2009/06/introducing-smart-navigation-in-street.html. Created Jun. 4, 2009.*

(Continued)

*Primary Examiner* — Reginald Renwick
(74) *Attorney, Agent, or Firm* — Banner & Witcoff, Ltd.

(57) ABSTRACT

Methods and systems for controlling vehicles within video games are described herein. A video game such as a vehicle-based combat game may have vehicles (such as airplanes) operating in a simulated three dimensional space. Users may partially control the direction of these vehicles using two-dimensional input devices by inputting a new direction for the vehicle to point and optionally a speed with which to pursue the new direction. Alternatively, a user may wish to engage in continuous banked turning of their vehicle to realistically simulate aspects of vehicle-to-vehicle combat. Rotation of the vehicle from its current direction to its new direction is controlled by an artificial intellect, which operates various control equipment of the vehicle to realistically simulate the path of the vehicle, based on whether a user has input a desired destination or a desired turn direction.

20 Claims, 13 Drawing Sheets

(56) References Cited

U.S. PATENT DOCUMENTS

| | | | |
|---|---|---|---|
| 6,670,957 | B2 | 12/2003 | Fukuda |
| 6,718,058 | B2 | 4/2004 | Ochi et al. |
| 6,727,889 | B2 | 4/2004 | Shaw |
| 8,535,154 | B2 | 9/2013 | Minato et al. |
| 8,641,526 | B1 | 2/2014 | Sitnikov |
| 2001/0035906 | A1 | 11/2001 | Fukuda |
| 2006/0094502 | A1 | 5/2006 | Katayama et al. |
| 2007/0270215 | A1 | 11/2007 | Miyamoto et al. |
| 2008/0070684 | A1 | 3/2008 | Haigh-Hutchinson |
| 2010/0048271 | A1 | 2/2010 | Champagne et al. |

OTHER PUBLICATIONS

Star Fox 64 (HQ)—Mission 1: Corneria. http://www.youtube.com/watch?v=jDU4WzM3NsM. Created Oct. 9, 2008.

Star Fox 64 (HQ)—Mission 2: Meteo, http://www.youtube.com/watch?v=jM7217EWti4, Created Apr. 21, 2009.

Jul. 10, 2013 Non Final Office Action issued in U.S. Appl. No. 13/768,420.

Google Maps, "Introducing Smart Navigation in Street View: Double-click to go (anywhere!)," http://google-latlong.blogspot.com/2009/06/introducing-smart-navigation-in-street.html, Jun. 4, 2009.

Apr. 12, 2013 Non-Final Office Action issued in U.S. Appl. No. 13/645,882.

Jun. 20, 2013 Final Office Action issued in U.S. Appl. No. 13/645,882.

Sep. 25, 2013 Notice of Allowance issued in U.S. Appl. No. 13/645,882.

Feb. 21, 2014 Notice of Allowance issued in U.S. Appl. No. 13/768,420.

Nov. 22, 2013 Office Action issued in U.S. Appl. No. 13/943,885.

Dec. 5, 2013 Non-Final Office Action issued in U.S. Appl. No. 13/768,420.

* cited by examiner

US 9,044,670 B2

USING INPUT FROM A POINTING DEVICE TO CONTROL A SIMULATED OBJECT

CROSS-REFERENCE TO RELATED CASES

This application is a continuation of pending application Ser. No. 13/645,882, filed Oct. 5, 2012, and having the title "Using Input From a Mouse Device to Control a Video Game Vehicle," the content of which is hereby incorporated by reference in its entirety for all purposes.

FIELD

Aspects of the disclosure relate to computer systems, computer software, and video games. More particularly, aspects of the disclosure relate to video game software, massive multiplayer online games, methods of controlling video game vehicles, and methods of playing video games where players control a vehicle capable of traveling in three dimensions.

BACKGROUND

Video games are increasingly popular. Online multiplayer video games have become particularly popular due, at least in part, to the ability of players to compete with multiple other human players.

Popular genres of multiplayer games include the first-person-shooter (FPS) and the third-person shooter genres. In FPS games, the player's on-screen view simulates the view of the character or vehicle controlled by the player; that is, the first-person view. The object of many FPS games is to accomplish a goal within a game. Common goals include killing other game characters that represent other players, capturing flags that represent opponents' territory, assaulting another team's base, and the like. Third person shooter games often have similar goals but differ in the perspective of the player. In third person shooters, the player views the game world from above or behind the character or vehicle controlled by the player.

Because online multiplayer games have become increasingly common, there is substantial competition between the offered games regarding obtaining and retaining consumers. Repetitive play can often lead to players becoming bored with a particular game.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, the present invention is directed to vehicular control within a simulated three dimensional graphical environment depicted by a computing device.

According to one aspect, one or more computer readable media may store instructions that, when executed by a data processing device, cause the data processing device to receive user input identifying a location of a two-dimensional input device; determine whether the location is within one of a first input area of a display screen and a second input area of the display screen; responsive to determining the location is within the first input area of the display screen, use destination-based control to alter a course of a vehicle in a simulated three dimensional environment depicted on the display screen based on a destination identified by the location of the two-dimensional input device; and responsive to determining the location is within the second input area of the display screen, use direction-based control to alter a course of the vehicle based on a direction identified by the location of the two-dimensional input device.

Some aspects described herein may be embodied in software, computer readable instructions, hardware, firmware, computer systems, devices, and the like.

In some embodiments the vehicle may include an airplane, tank, battleship, warship, warplane, helicopter, submarine, and/or spaceship.

In some embodiments the first input area may include or consist of the interior area of a circle around a targeting reticle associated with the vehicle, and the second input area may include or consist of a portion of the display screen outside the circle.

In other embodiments the first input area may encompass the entire display screen, and/or may be definable by a user.

DETAILED DESCRIPTION

In the following description of the various aspects, reference is made to the accompanying drawings, which form a part hereof, and in which is shown by way of illustration how various features described herein may be practiced. It is understood that other embodiments may be used and structural and functional modifications may be made.

Figure 1:
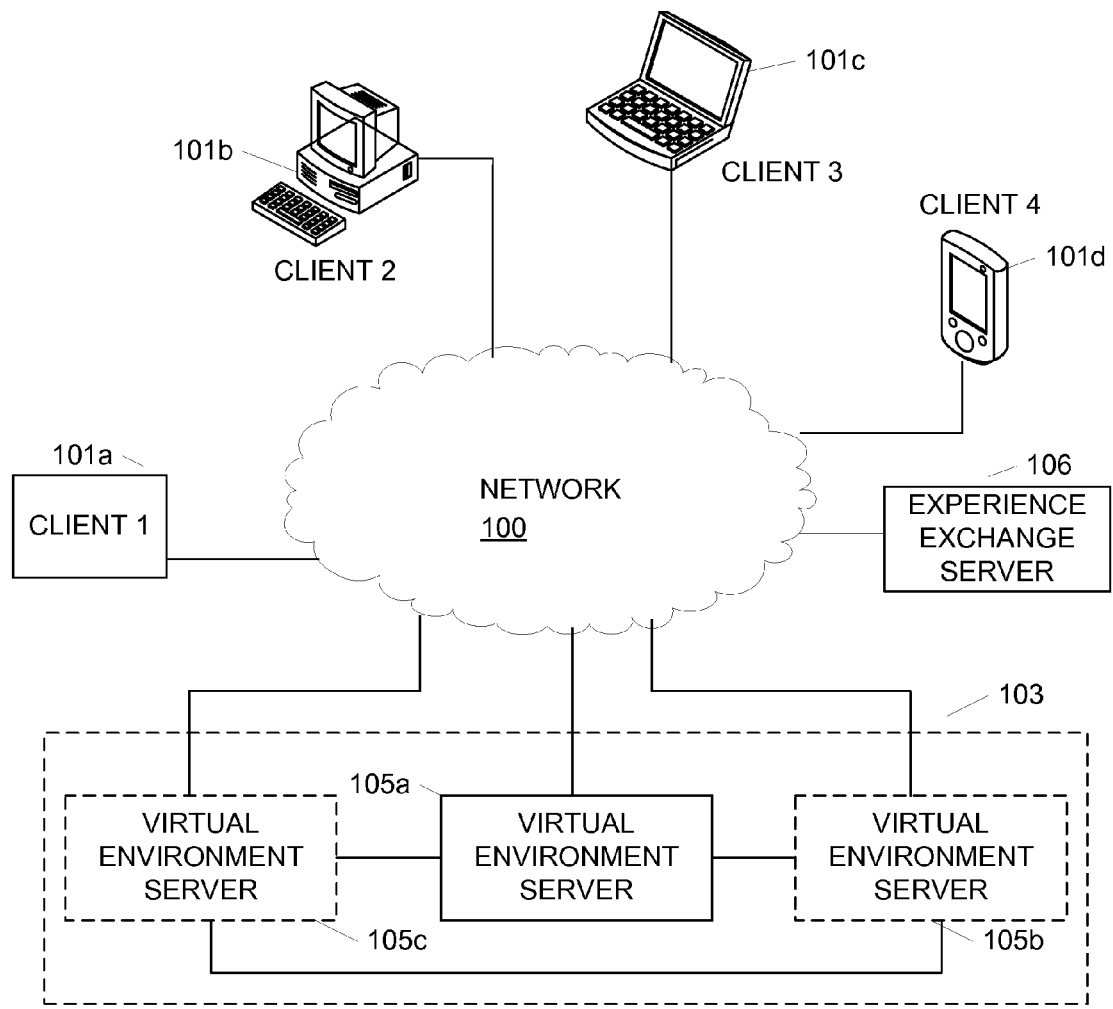
FIG. 1 is an illustrative network environment in which one or more aspects described herein may be used.

FIG. 1 illustrates a network environment in which clients 101 may interact with virtual world servers 105 to provide a virtual world for users to access. Clients 101 may include a variety of devices including generic data processing device 101a, personal computer (PC) 101b, laptop, portable, or netbook computer 101c, personal data assistant, mobile phone or device 101d, a tablet device (not shown) and the like. Each of clients 101 may have a network adapter that allows clients 101 to connect to virtual world servers 105 through network 100. In one example, network 100 may include an Internet Protocol (IP) based network, e.g., the Internet. Other networks may include cellular networks, cable networks, fiber optic networks, wireless networks, wired network and/or combinations thereof. Network 100 may further include one or more sub-networks such as wired or wireless local area networks (LANs), wide area networks (WANs), and the like.

In one or more arrangements, virtual world servers 105 may be included in a virtual world server system 103 that includes multiple linked servers 105. Using such a distributed system, servers 105 may be able to distribute load across each of server 105. For example, if server 105a is experienced high loads, some of the operations may be passed to either server 105b or 105c or both. Load may further be distributed based on user geography or on other predetermined bases. Alternatively, the virtual world may be hosted on a single server, e.g., virtual world server 105a. Each of servers 105 may collectively generate and manage a single instance of the virtual world, or each server 105a, 105b and 105c may provide independent instances of the world. An instance of a virtual world, as used herein, describes a stand-alone copy of the virtual world that does not interact with or depend on other instances of the virtual world. Depending on the processing load, a virtual world server system 103 may divide a plurality of users among multiple instances of the virtual world, each hosted on a different server, to reduce or alleviate overloading on a single server or prevent overpopulation. Each server 105 may be logical or physical, e.g., multiple logical servers may reside and be running on the same physical computing device/server, or servers may be physically separate devices.

Figure 2:
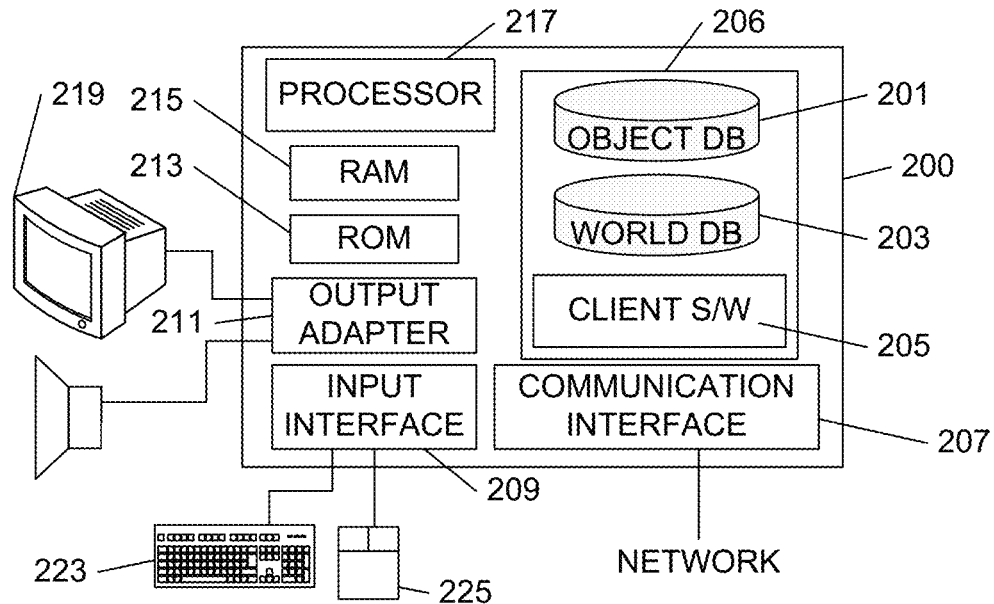
FIG. 2 illustrates a client device that may be used according to one or more aspects described herein.

FIG. 2 illustrates an example client device 200 such as PC 101b (FIG. 1) that may be used to access and interact with a virtual world provided by a virtual world server such as server 105a of FIG. 1. Client device 200 may include a variety of components and modules including a processor 217, random access memory (RAM) 215, read only memory (ROM) 213, databases 201 and 203, client software 205, output adapter 211, input interface 209 and communication interface 207. Software, databases, operating systems, and the like may be stored in nonvolatile memory 206 (e.g., a magnetic disk or solid state hard drive, or equivalent). Object database 201 may be configured to store data defining and otherwise associated with an object used by a user of device 200 to explore and interact with the virtual world. World database 203, on the other hand, may be configured to store data for defining and generating the environment in which the objects exist. For example, world database 203 may store texture maps for rendering a floor or ground, walls, a sky and the like. In another example, world database 203 may store simulated environments, buildings, trees and other data defining animate or inanimate objects existing in the world, data defining computer controlled characters and the like. Each of database 201, 203 may or may not be a conventional database, and instead may refer to data stored in a memory, accessed as needed by the client software. Data associated with an object or the virtual world may be communicated between client device 200 and a virtual world server using communication interface 207. For example, object positions, attributes and status may be updated or environments may be changed by communicating such data through interface 207. In an alternative embodiment, instead of or in addition to databases 201, 203, client device 200 may maintain a state of a user account as it interacts with one or more game servers, and client software 205 may render and represent the game environment on an output display based on the present account state. The state information may include, e.g., location, health, team, etc.

The world and the objects may be rendered by client software 205 and subsequently sent to output adapter 211 and display 219. The client software 205 may, in one or more arrangements, be configured to generated three dimensional (3-D) models of the virtual world and components thereof as well as the object corresponding to a user. A user may control the object and interact with the world through input interface 209 using various types of input devices including keyboard 223 and mouse 225. Other types of input devices may include a microphone (e.g., for voice communications over the network), joysticks, motion sensing devices and/or combinations thereof. In one or more arrangements, music or other audio such as speech may be included as part of the virtual world. In such instances, the audio may be outputted through speaker 221. In some embodiments, the virtual world may be a graphical representation only, and objects in the virtual world may be renderings, as opposed to objects in an object oriented programming language.

Client software 205, computer executable instructions, and other data used by processor 217 and other components of client device 200 may be stored RAM 215, ROM 213, nonvolatile memory 206 or a combination thereof. Other types of memory may also be used, including both volatile and nonvolatile memory. Software 205 may provide instructions to processor 217 such that when the instructions are executed, processor 217, client device 200 and/or other components thereof are caused to perform functions and methods described herein. In one example, instructions for generating a user interface for interfacing with the virtual world server may be stored in RAM 215, ROM 213 and/or nonvolatile memory 206. Client software 205 may include both applications and operating system software, and may include code segments, instructions, applets, pre-compiled code, compiled code, computer programs, program modules, engines, program logic, and combinations thereof. Computer executable instructions and data may further be stored on some physical form of computer readable storage media (referred to herein as "computer memory") including, e.g., electrically erasable programmable read-only memory (EEPROM), flash memory or other memory technology, CD-ROM, DVD or other optical disk storage, magnetic cassettes, magnetic tape, magnetic storage and the like.

Figure 3:
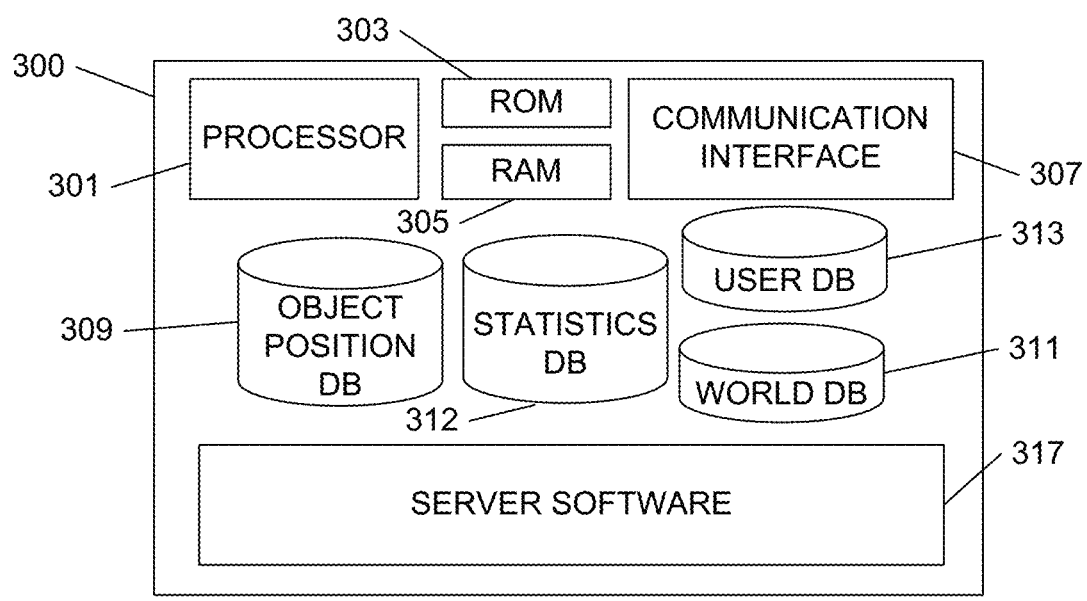
FIG. 3 illustrates a server device that may be used according to one or more aspects described herein.

Referring now to FIG. 3, a virtual world server 300 may be configured to generate and operate a massive multiplayer online game, such as virtual world or the like. Server 300 may include processor 301, ROM 303, RAM 305, communication interface 307, object position database 309, world database 311, user database 313, and server software 317. Object position database 309 may be configured to store position information for each object (e.g., based on commands to move a vehicle received from each client).

A world database 311 may store rules, algorithms and other data for interactions that are available in the world. For example, a manner in which a computer controller character moves or otherwise behaves may be defined in data stored in world database 311. Additionally, item information may be defined in world database 311 so that items may not be modified by each client. In another example, world database 311 may store location information for non-object items and components. User database 313, on the other hand, may be configured to store information describing a user controlling an object. For example, user database 313 may include account information, user preferences, one or more classes of user experience points and/or levels, payment information, user identification information, character definitions, state tables, and the like. Each of databases 309, 311, 313 may or may not be a conventional database, and instead may refer to data stored in a memory, accessed as needed by the server software.

Features described herein may be used with or in a variety of video games, including but not limited to, WORLD OF TANKS, WORLD OF WARPLANES, and/or WORLD OF WARSHIPS by WARGAMING.NET. Aspects described herein may also be used with other video games and are not limited to any one genre or implementation. Aspects described herein may be implemented in video game application software stored on a computer readable medium, e.g., storage 201, 203, 205, 206, 213, 215, 309, 311 and/or 313, and executable by a data processing device.

Various aspects of the disclosure provide features and capabilities that enhance game play by providing options through which users can develop strategies to play the video game. According to various aspects described herein, a video game may provide a graphically stimulated virtual world or virtual environment, in which the game takes place, referred to herein interchangeably as a virtual world and as a simulated environment of the video game. The simulated environment may have features similar to actual geographic locations or may have fictional, science fiction or fantasy-themed environments.

Figure 4:
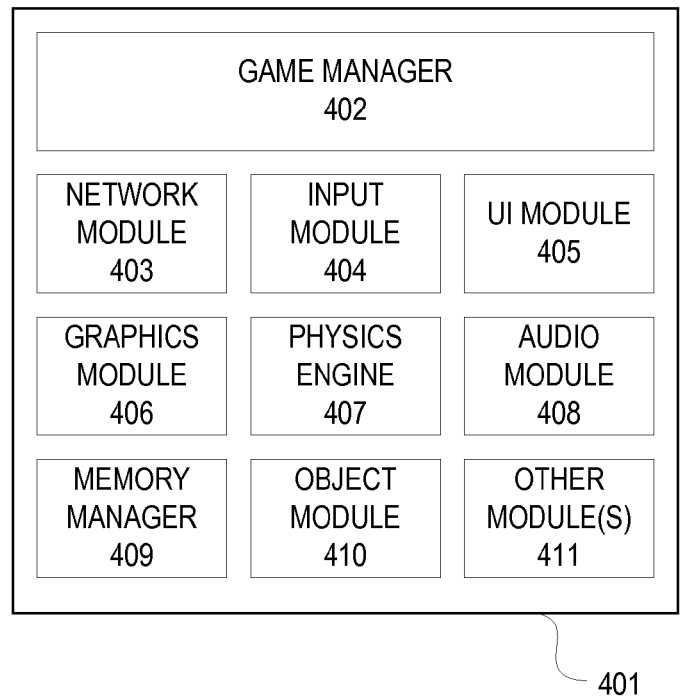
FIG. 4 illustrates software modules that may be used according to one or more aspects described herein.

FIG. 4 illustrates a block diagram of a video game software application 401. Each block in FIG. 4 illustrates a logical software module or function that performs an action, provides a capability or feature, implements an object, or performs some other aspect of the video game. When the video game software 401 executes on a data processing system such as a PC or game console, the modules operate collectively to provide a video game experience to a player. The modules illustrated in FIG. 4 are illustrative only, and additional or different modules may be used. The same, additional or different modules may be executed in tandem on a server with which each client device is connected.

Video game software 401 may include, e.g., a game manager module 402, which manages the overall operation of the video game and may be the initial module launched when the video game is executed. Video game software 401 may also include a network module 403, which manages network games sessions. A network game session may include e.g., a co-operative campaign with other networked players, or other compartmentalized periods of game play involving players located at discrete network locations. A memory manager module 409 performs memory management during execution of the video game 401. An input module 404 may receive and interpret user input via a game controller, keyboard, mouse, and the like, and provide the interpreted commands to game manager 402, network module 403, or other applicable module. UI module 405 may manage and control the user interface, including the display displayed on the video output device, interpreting input via the input module 404, and providing audio output via audio module 408.

Various software modules may operate with one or more classes or objects defined and used in the video game 401. The classes and objects may be defined with reference to an object module 410, and may include portions of executable software code and/or one or more data structures, depending on the object. Each object may be rendered and simulated in the virtual world in accordance with a physics engine 407. Video game software 401 may include other software modules 411 as needed. FIG. 4 illustrates one possible software architecture. Others may be used. Each module depicted in FIG. 4 may communicate directly or indirectly with each other module, e.g., by passing objects, data, parameters, input, and output, etc.

A first class of in-game objects may define vehicles in the video game. A vehicle may be defined as any simulated inanimate object directly or indirectly controllable by or dependent on an in-game character and/or user/player. Illustrative vehicles may include airplanes, helicopters, tanks, ships (and/or submarines), battleships, and the like. Vehicles may have various attributes and functions that provide advantageous qualities to the vehicle during combat. For example, some vehicles might be fast with minimal firepower, whereas other vehicles may be slower but extremely powerful. Infinite variations of strength, speed, defense, and any other attribute are possible.

A second class of in-game objects may define characters in the video game. Characters may be defined by various attributes associated with the character, e.g., name, physical appearance, skills, etc. Skills may be defined based on a character's genre or task, e.g., ball turret gunners and pilots in the present example. A ball turret gunner may have skills such as aiming accuracy and aiming speed and a pilot may have skills that regulate the vehicle speed or precision of direction. Additional character attributes may include one or more other skills that can improve performance of the character or vehicle so as to enhance the strategic gaming experience such as firefighting skills, the ability to repair vehicles, the ability to perform aerial maneuvers, and the like. The second class of objects may further include munitions, equipment, and upgrades usable with one or more of the objects in the first class of game objects.

Object module 410 may provide an array of vehicles, vehicle components, characters and other equipment. Vehicles, vehicle components, characters and other equipment may be defined by one or more objects and instantiated during the game. Each object may have various attributes and functions and provide advantages and disadvantages based thereon. A vehicle component may refer to an upgradeable component of a vehicle, e.g., engine, payload, guns, etc.

Figure 5A:
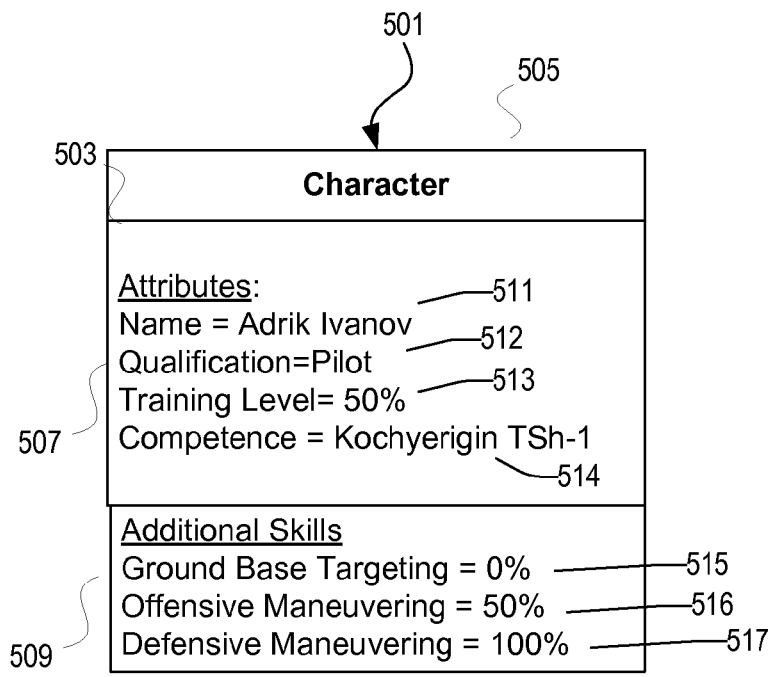
FIGS. 5A-5B illustrate software objects that may be used according to one or more aspects described herein.

FIG. 5A illustrates a block diagram of an instance 501 of a character object within the second class of game objects. Object instance 501 has an object class 505 (Character). Instance 501 may acquire one or more attributes from the object class. Attributes 507, when examined, define a state of the instance. In this example, the Character has the following attributes: Name 511, Qualification 512, Training Level 513, and Competence 514. A character may also have additional skill types 509. Additional skill types may include Aerial Engagement skills 515, Targeting skills 516, and Maneuvering skills 517. Other skill types, attributes, etc., may also or alternatively be used.

Each attribute may have a particular value. The attribute may have a default value inherited from the Qualification type 512. For some attributes, a player may increase attribute value by allocating experience points, gained during gameplay, to the character. Increased attribute value enhances gameplay by improving performance of the vehicle containing the characters. For example, by allocating experience points to the pilot of an airplane, the Training Level 513 may be increased resulting in more accurate piloting by a vehicle containing that character, leading to improved vehicle performance during battle. Similarly, the effectiveness of the additional skill types is increased in accordance with the value of the skill. Thus, for example, an Offensive Maneuvering skill 516 value of 100% is proportionally more effective than a value of 50%. Increased offensive maneuvering effectiveness may result in better positioning of the aircraft for firing upon enemy vehicles during combat. By staffing a vehicle (one of the first classes of objects) with characters having improved attributes and skills, vehicle performance is maximized allowing for a more effective performance during game play. Vehicles may further be staffed or equipped with other objects of the second class of objects, e.g., munitions, equipment, and/or upgrades, to further improve vehicle performance.

In some embodiments, attributes might not be able to be changed. Qualification 512 may not be changed; for example, a pilot may not be retrained as a ball turret gunner. A character's Competence attribute 514 refers to their ability to operate a specific vehicle type; for example a specific type of aircraft such as the Kochyerigin TSh-1 airplane. Competence 514 may be changed by retraining the character to operate the same Qualification 512 on a different vehicle. Changing Competence 514 may result in a decreased Training Level 513 in the new vehicle. Additional experience points may be used to raise the Training Level 513 in the new vehicle. A character may eventually be associated with multiple competence attributes—one per vehicle the character has been associated with. In some embodiments, character training may further be limited based on a national origin of the in-game character, or based on some other designation. For example, a character said to be from Russia might not be permitted as crew in a vehicle originating from Japan.

Figure 5B:
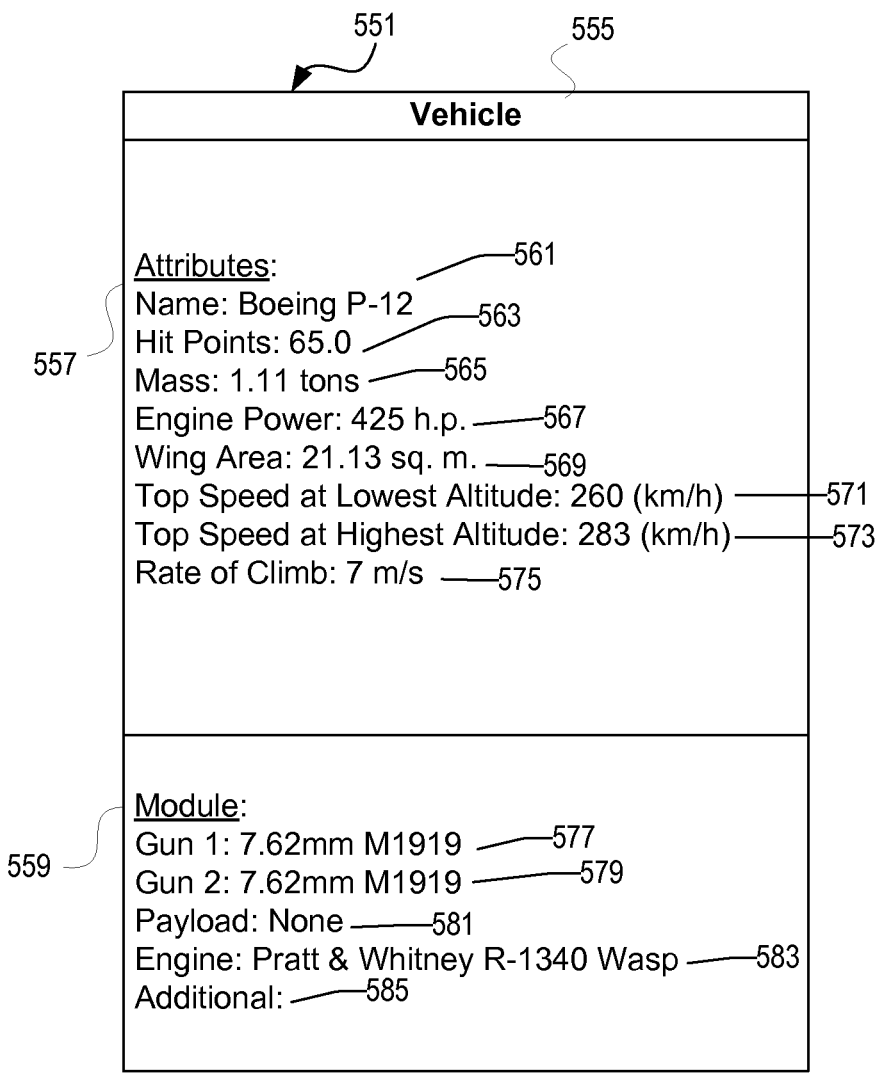

FIG. 5B illustrates a block diagram of an instance 551 of a vehicle object within the first class of game objects. Object instance 551 has an object class 555 (Vehicle). Instance 551 may acquire one or more attributes 557 from the object class. Attributes 557, when examined, define a state of the instance. In this example, object instance 551 is a Boeing P-12 and has attributes with values typical of fighter aircraft. Illustrative attributes may include Name 561, Hit Points 563, Mass 565, Engine Power (h.p.) 567, Wing Area 569, Top Speed at Lowest Altitude 571, Top Speed at Highest Altitude 573, and Rate of Climb 575. These attribute contribute to the vehicle's effectiveness in combat. Attribute types may also have an attribute value, which determines the effectiveness of the attribute function. For example, the Top Speed at Highest Altitude attribute 573 has a value of 283 km/h, which indicates how fast the vehicle can travel at the highest altitude of its service range. One or more of the attributes, alone or in combination, may be used to assign the vehicle to a subclass. In this example, vehicle 551 may be in a subclass of fighter aircraft referred to as "Light Fighters" based on hit points, speed, armor, etc. Other classes of fighter aircraft may include medium fighters, heavy fighters, attack planes, carrier-based planes, bombers, and scouts, among others. Subclass may be used to quickly identify to a user a general approximation of attributes associated with a vehicle without requiring the user to review each attribute in detail.

Vehicle attributes may be altered by adding or upgrading modules associated with a vehicle. A vehicle contains modules classes 559. Each module class may contain one of a variety of module types appropriate to the module class. In one example, module classes may include Gun 1 577, Gun 2 579, Payload 581, and Engine 583. In another embodiment, modules may include airframe modules, bomb modules, and rocket modules. Additional 585 modules may be added to provide additional functions or otherwise modify vehicle attributes 557. Within each class, a vehicle may be outfitted with one module type that falls within the class. For example, five increasingly powerful gun types may be available within the gun class. Similarly, there may be multiple payload types within the payload class. Adding or changing a module type alters vehicle attributes 557 based on the effectiveness of the newly installed module type. The vehicles physical appearance and/or flight characteristics may also be altered, based on the airplane model and module added. Thus, for example, if the Engine module 583 type Pratt & Whitney R-1340 Wasp is replaced by a more advanced module the Rate of Climb 575 attribute value may increase based on a rate of climb value associated with the more advanced module. An increased Rate of Climb value, in turn, may allow the vehicle to more quickly ascend into or out of an in-flight battle during game play, making the player more competitive against opponents and resulting in an enhanced gameplay experience for that player.

Acquiring Input from a Mouse Device to Control a Video Game Vehicle

According to some aspects, the user may be in control of a vehicle (e.g., an aircraft) and tasked with performing one or multiple game objectives as part of the game play. Example game objectives may include engagement in combat with a member or members of an opposing team, targeting and firing upon an opposing team's base or territory, and/or performing a sequence of vehicle maneuvers. A current example of a vehicle may be a fixed-wing aircraft (although rotating wing, vertical thrust, and other types of aircraft may also be simulated). Various aspects of the disclosure provide features and capabilities that enhance game play through facilitating control of the movement of the vehicle based on user input from a mouse (or other two dimensional input) device. Such aspects may allow a user to more rapidly learn how to control and maneuver vehicles within the virtual world and may enable the user to better focus on completion of game objectives. Although not limiting, attention is given herein to vehicles capable of movement within three dimensions, e.g., aircraft, spacecraft, submarines, etc., rather than vehicles that move in two dimensions, such as cars and boats. Other control methods may also be used.

Figure 6:
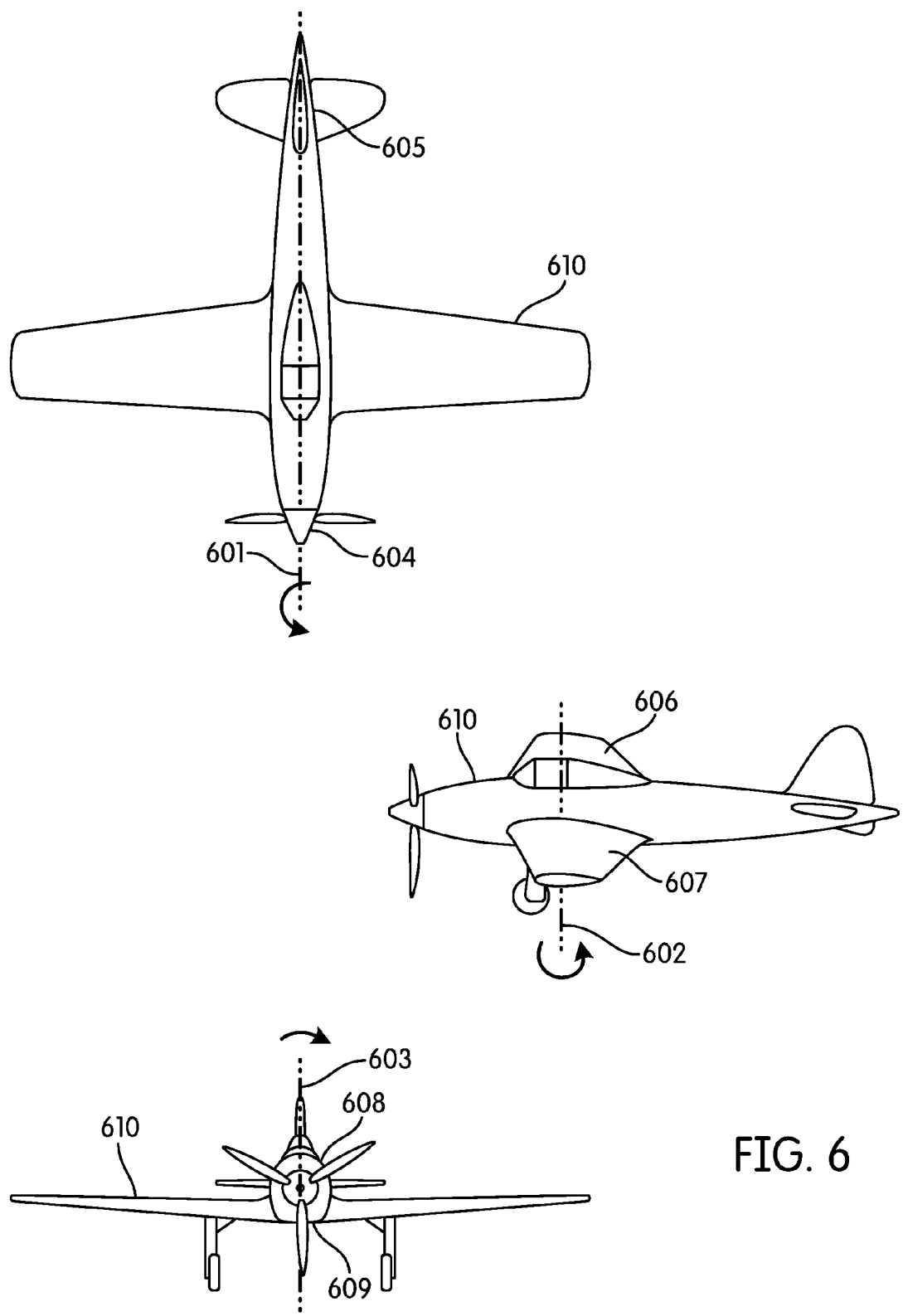
FIG. 6 illustrates flight dynamics that may be used according to one or more aspects described herein.

Realistic and accurate pursuit of a new direction of travel may be performed by rotation of the vehicle along one or more axes through the vehicle's center of mass. FIG. 6 illustrates the conventional axes of rotation. Rotation along axis 601, which intersects the vehicle 610 through its nose 604 and tail 605 substantially parallel to the ground, is conventionally called "roll." Rotation along axis 602, which intersects the vehicle 610 laterally and substantially parallel to wings 606 and 607, is conventionally called "pitch." Rotation along axis 603, which intersects the top 608 and bottom 609 of the vehicle 610 substantially perpendicular to the ground is conventionally called "yaw."

Once the game begins or a user is given full control of the vehicle by the video game software, the user may provide directional input using a mouse or other two dimensional input device (collectively referred to herein as a mouse). The input may be representative of a new direction of vehicle travel that the user wishes the vehicle to pursue. That is, the use may use a mouse to place a cursor at a position on the screen that indicates either where the user wants to go, specifically, or a general direction the user wants to travel. Input may be provided using a joystick, in which case conventional and known flight control techniques may be used.

In some embodiments a user might only have a mouse and keyboard available to provide input to the game. In such an embodiment, the input is provided to the video game software by movement of the mouse 225 located proximately to the client device 200. For example, if the user wants the vehicle to pursue a course toward an object currently off the left side of the vehicle and at a lower altitude than the vehicle (from the viewpoint of the user), she may drag the mouse diagonally to the left and toward her body (resulting in a cursor moving down and town the left on a display screen) to indicate that she wishes the vehicle to bank left through a combination of roll and yaw, as well as pitch the vehicle's nose below the horizon. This input is provided to the input module 404, which either alone or in combination with other modules of the video game software 401 performs various calculations regarding the movement of the vehicle as further described below.

Figure 7A:
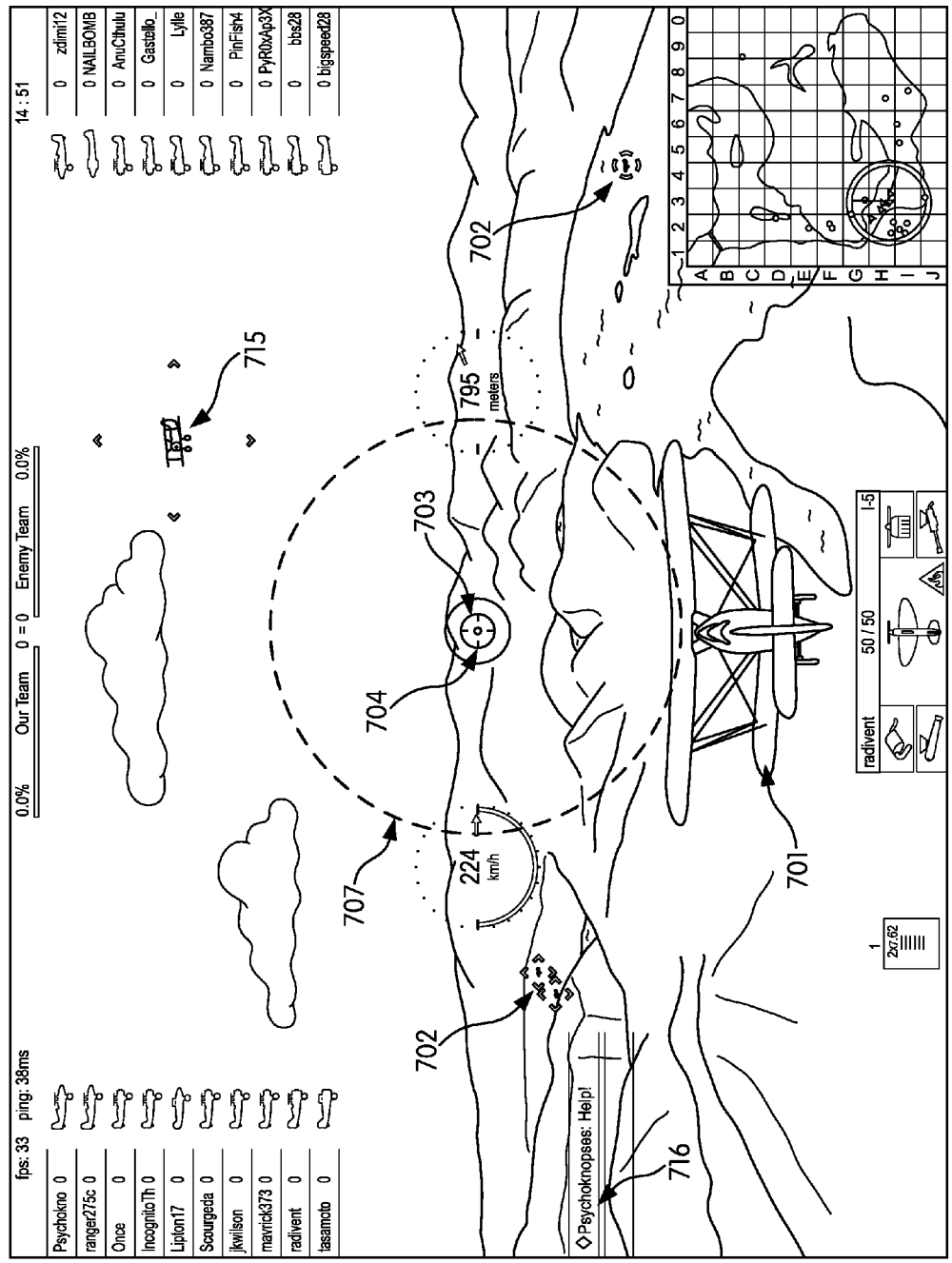
FIGS. 7A-7D illustrate flight control techniques that may be used according to one or more aspects described herein.

With reference to FIG. 7A, a sample video game display may include a vehicle 701 controllable by a user, one or more targets 702 (e.g., ground-based and/or airborne), one or more friendly entities 715, chat window 716, a directional input indicator/cursor 703 (e.g., a mouse pointer) that may move correspondingly to mouse input, a targeting reticle 704, and a visual input cue 707. Input indicator may alternatively be displayed as a small circle, square, or other shape, and may be colored, e.g., green, for easy visual identification. Targets may be displayed with differing visual cues, e.g., a circle to indicate an enemy airplane, and a diamond to indicate a ground target. Directional input indicator 703 allows the user to input a desired direction of travel. As further described below, the desired direction of travel may be absolute, namely, based on a specific chosen destination, or relative, that is, indicating a change in direction a present heading. In some aspects, the directional input indicator may be a simple shape such as a pointer, arrow, circle, square, rectangle, or ellipse, but according to other aspects may be other symbols or groupings of symbols capable of illustrating to the user an inputted destination or direction of travel, as further described below.

Targeting reticle 704 serves two purposes in the present example. Indicator 704 shows the user the instant orientation of the vehicle 701 relative to the game environment. In other words, indicator 704 shows where the nose of vehicle 701 is pointed at any given moment in time. In some embodiments, indicator 704 may be a targeting reticle, usable for determining plane orientation with respect to targets. In other embodiments, indicator 704 may be an artificial horizon indicator, which not only indicates an instantaneous direction of travel, but also a plane's orientation to a horizon line in the simulated game environment. In other embodiments both a targeting reticle and an artificial horizon may be used and/or may be displayed on the display screen, as desired. When reticle 704 is not a targeting reticle, indicator 704 may be overlapping with a targeting reticle for a weapon (such as a gun) of the vehicle. In other aspects, the targeting reticle may be indicator 704. Targeting reticle 704 also indicates where gunfire from aircraft vehicle 701 will be targeted, if the user provides input to fire the aircraft's weapon systems.

Visual input cue 707 serves multiple purposes as well. First, cue 707 provides a visual indication to the user identifying a region of the screen in which fine tuning directional input may be provided. Second, cue 707 divides the screen into two discrete input areas: a region inside cue 707, and a region outside cue 707. When input cursor 703 is within the region defined by cue 707, user input may be interpreted as the user identifying a specific destination, also referred to as destination-based control. Stated differently, when the user places input cursor 703 at a location within cue 707, the software may provide control inputs to vehicle 701 to cause vehicle 701 to turn as needed to result in a direction of travel towards the location identified by input cursor 703. When the user places input cursor 703 outside cue 707, input is analyzed based on directional-based control. Directional-based control refers to the software providing control inputs to vehicle 701 to cause vehicle 701 to turn based on the location of cursor 703 relative to the position of reticle 704. The vehicle may continue to turn based on a location of cursor 703 until cursor 703 is brought back within the confines of cue 707. The rate of turn may further vary based on how far cursor 703 is located on screen from reticle 704. In some embodiments, visual cue 707 might not be displayed. In such a case, cue 707 is merely an unseen boundary between the two input regions.

In some embodiments, a user may dynamically configure a size and/or shape of cue 707, e.g., based on a user preference to control a vehicle's destination versus direction. Users may prefer destination-based control when targeting a stationary target, such as an immovable ground target, and therefore make cue 707 larger. Users may prefer directional-based control when targeting moving targets, such as enemy aircraft, ground vehicles, moving battleships, etc., and therefore made cue 707 smaller.

Using this dual mode input, a user can decide whether to control an airplane by identifying a destination or a direction, as desired. Users can see the direction of travel resulting from the input when in destination-based control, which reduces the risk of erroneous input and reduces the risk of overcorrecting.

The input indicator 703 and reticle 704 may overlap after vehicle 701 has completed its course alteration to a new direction as input by the user within cue 707. Furthermore, assuming no additional mouse movement by the user, the distance between indicator 704 and directional input indicator 703 may decrease as the vehicle rotates towards the direction input by the user. Of course, if the user inputs a new desired direction of travel while the vehicle is already rotating to a direction previously inputted, the vehicle may begin to pursue that new direction immediately upon receiving the input.

In addition to control of the direction of the vehicle, in some embodiments the user may partially control a speed of rotation with which the vehicle completes its rotation to the new direction of travel. According to some aspects, the speed of rotation may be controlled by increasing or decreasing the distance of the directional input indicator 703 from reticle 704. When indicator 703 is within cue 707 but near the boundary of cue 707, a speed of rotation may be faster than when indicator 703 is nearer to reticle 704. When indicator 703 is outside cue 707, rotation speed may increase as indicator 703 moves farther away from cue 707. For example, moving input indicator 703 a small amount outside cue 707 may result in a gentle continuous yaw, pitch and/or roll toward the inputted direction, useful for making small adjustments to the vehicle in preparation for firing upon an enemy base. Moving input indicator 703 a larger amount away from cue 707 may result in a steep continuous movement toward the inputted direction, which may be necessary when offensively or defensively maneuvering against another aircraft. The speed of rotation may be limited to a predetermined maximum value, regardless of distance between rotational indicator and the center of the display, by fixed or variable characteristics of the character object controlled by the user (e.g., the type of vehicle being flown), the vehicle object controlled by the user, or as characteristics of the game map or session in which the vehicle object is operating. Other control inputs may also affect a speed of rotation, e.g., using a plane's flaps, turbo boost, turning off the plane's engine, and/or rolling the plane, among others.

Figure 7B:
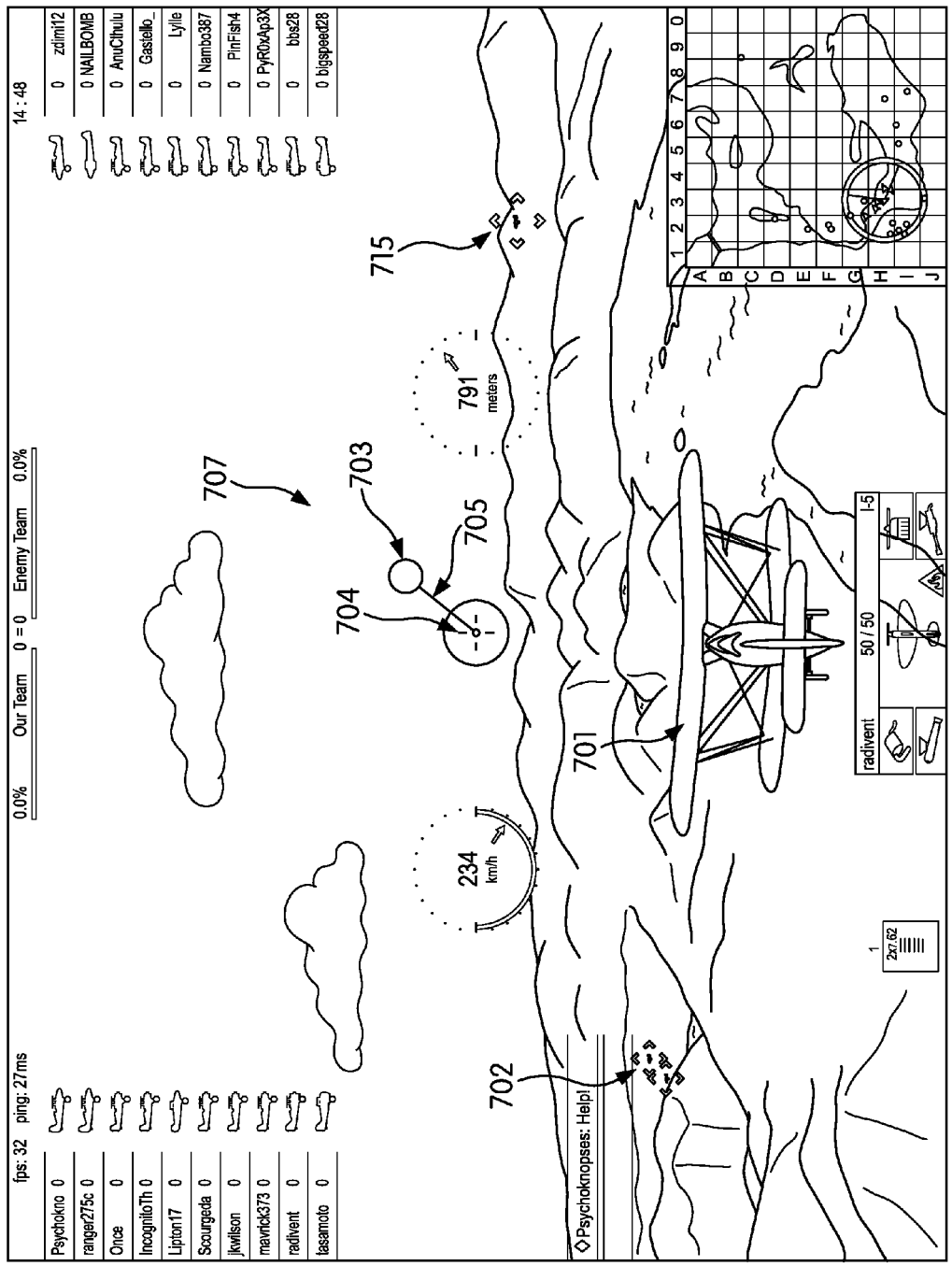

With reference to FIG. 7B, one or more rotational speed indicators 705 may optionally be shown on the display screen to assist the player in understanding distance of indicator 703 from indicator 704 while controlling the vehicle 701. As one example, the rotational speed indicator may be a line 705 connecting the center of the screen with the directional input indicator 703. As another example, the rotational speed indicator may be represented using opacity, color, or gradient of a shape, such as an arrow, indicating the direction of the rotation. In some aspects, this shape may be the directional input indicator.

Figure 7C:
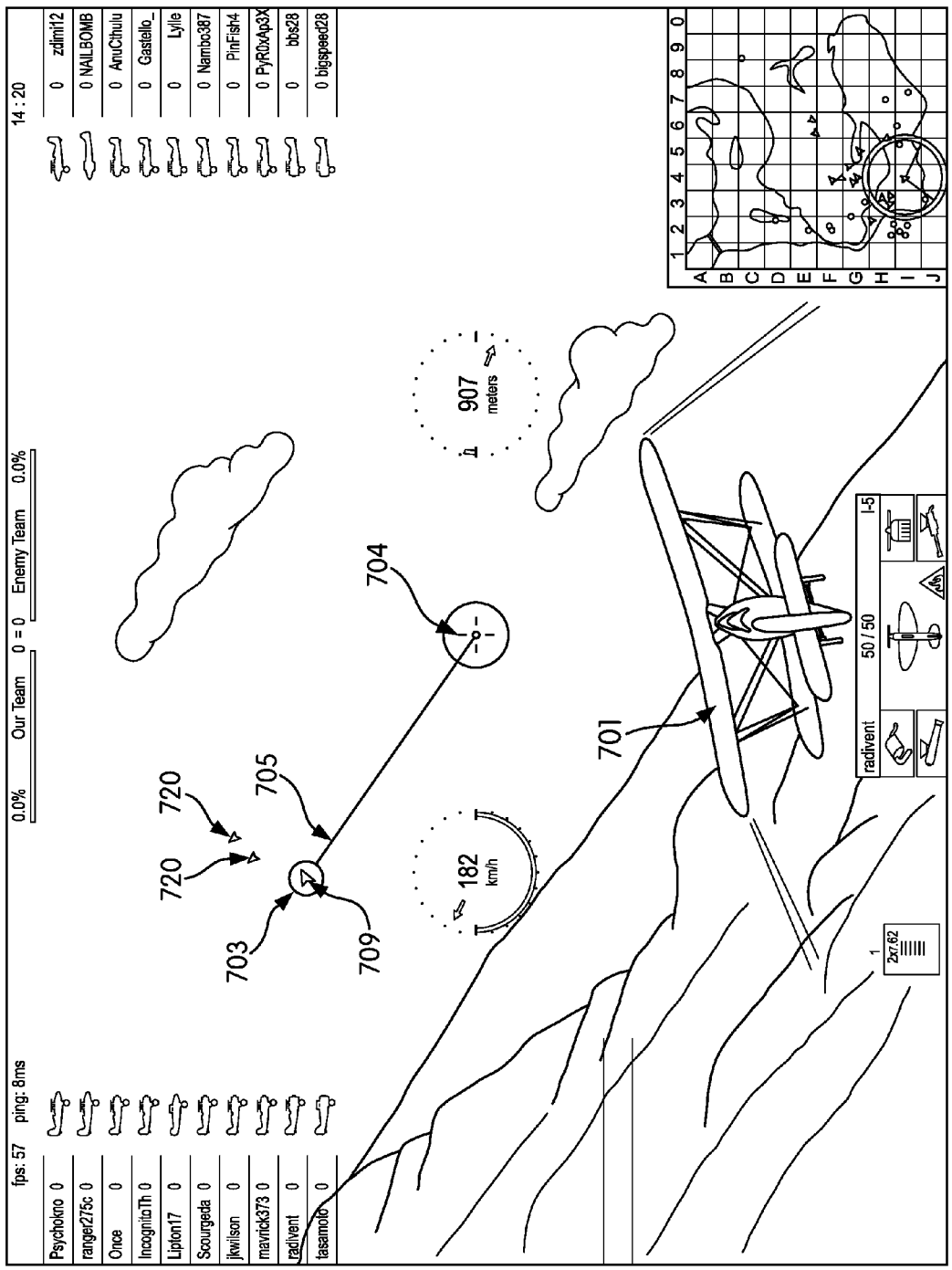

FIG. 7C illustrates vehicle 701 in a steep turn resulting from the user having moved input indicator 703 outside of boundary 707 (not shown). The system, however, indicates to the user that indicator 703 is outside boundary 707 by including an arrow 709 within indicator 703. Arrow 709 provides visual feedback to the user that the system is in direction-based control mode, rather than destination-based control mode. Arrows 720 indicate a relative direction of two nearby airplanes. Whether the airplanes are friend or foe may be further indicated by a color of the arrows, e.g., green for friend, red for foe, or a third color representing an airplane in pursuit.

When the user returns indicator 703 within boundary 707, as the vehicle completes its rotation to the new direction of travel, the speed of rotation may decrease to realistically portray vehicle motion to the user. Accordingly, the rotational speed indicator 705 (or indicator 703) may change in size, shape, opacity, gradient, or color, as illustrative examples, to indicate to the user that the vehicle's speed of rotation is declining.

In some aspects, the rate of movement of the directional input indicator may be partially influenced by a mouse sensitivity setting. The mouse sensitivity setting may be provided either by any of the various modules of video game software 401 or the operating system running the video game software. A decrease in the mouse sensitivity may result in requiring an increased amount of actual movement of the mouse device to achieve the same movement of the directional input indicator on the display. Similarly, an increase in mouse sensitivity may result in a decreased amount of actual movement of the mouse device required to achieve the same movement of the directional input indicator on the display. Customizable user control settings may also be present and influencing upon the movement of the directional input indicator. As one example, the user may select an "inverted" mode reversing the input directions along the z-axis. Where a user using a non-inverted mode may push the mouse away from them to indicate a desire for the vehicle to pitch its nose above the horizon, a user using the inverted mode may pull the mouse toward them to indicate a similar desire. Other user control settings may be provided, either by the video game software or any of its modules to enable the user to customize various aspects of how the input is processed.

Figure 7D:
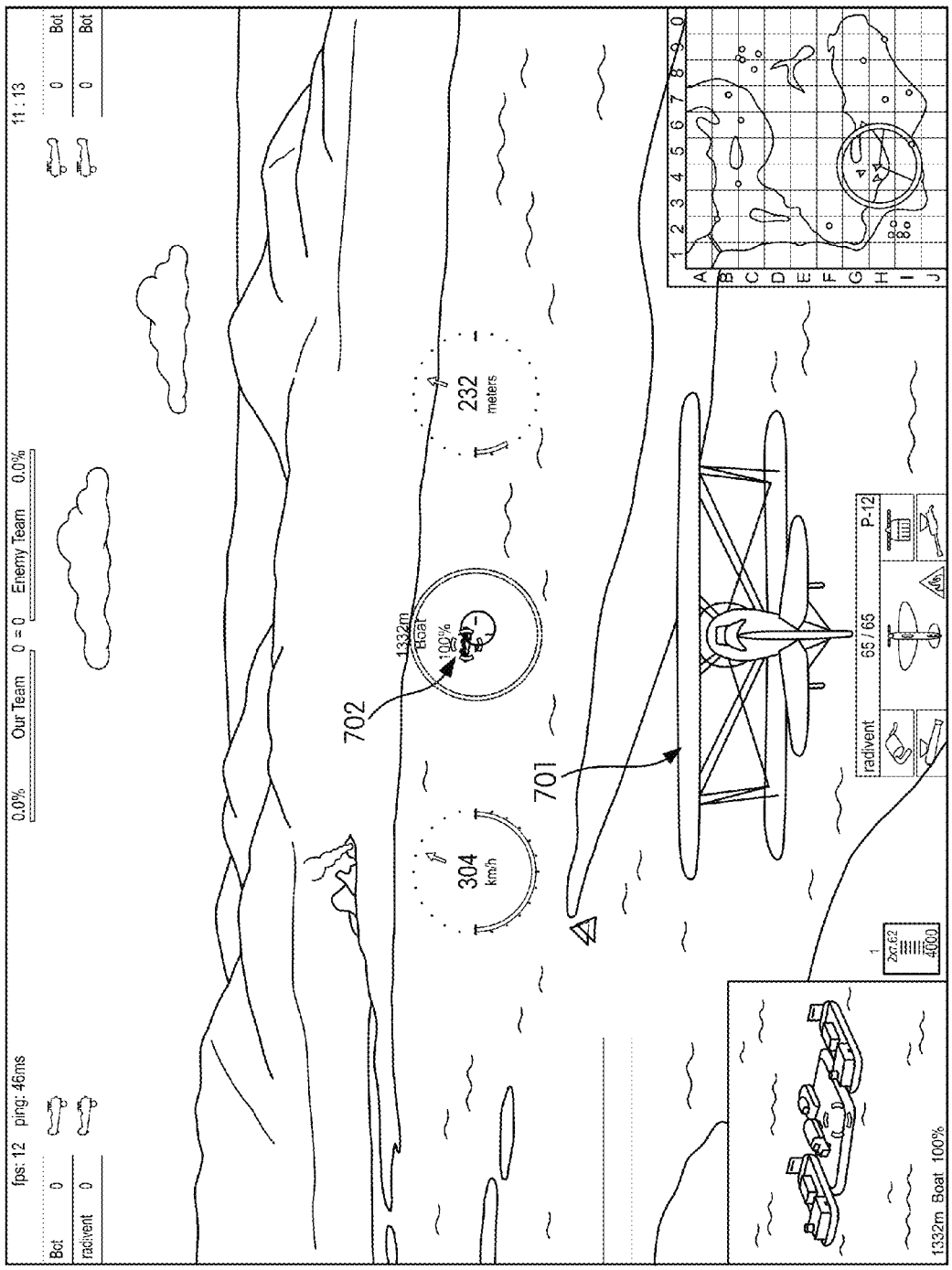

With further reference to FIG. 7A-7D, various aspects of the directional input indicator and rotational speed indicator as they pertain to the rotation of the vehicle are now described. In this illustrative situation, a user is controlling a vehicle 701, and tasked with firing upon a target 702. FIG. 7A-D show movement of vehicle 701 based on input from the user using a mouse device. In FIG. 7A, when viewed from behind vehicle 701, target 702 is positioned to the left and well ahead of the nose of vehicle 701. In FIG. 7B, the user initially moves the mouse away and to the right, relative to the user's body (assuming a right-handed user). Rotational speed indicator 705 (here, a line of varying length) is displayed based on the distance the user has dragged the mouse device (and the directional input indicator). The system controls the vehicle 701 using destination based control. In FIG. 7C, the user banks hard left, by moving the mouse to the left so that indicator 703 is outside boundary 707. The system now controls the plane in continuous rotation in direction-based control. In FIG. 7D the user has moved the indictor 703 back within boundary 707, and vehicle 701 has settled into a straight line path toward target 702.

According to some aspects, some game play situations may necessitate a vehicle controlled by the user to engage in continuous rotation. For example, in a game where two or more fixed-wing aircraft engage and pursue each other, sometimes called air combat maneuvering or "dogfighting," circling constantly in air may be an attacking or defending tactical maneuver. Given no other input, a vehicle in continuous rotation will constantly rotate in a circle around a fixed point. The location of the fixed point is dependent on the rate of rotation and direction of rotation of the vehicle from the mouse input provided by the user. Such continuous rotation may occur while in directional-based input mode, until the user moves the input indicator 703 back within cue 707.

Figure 8A:
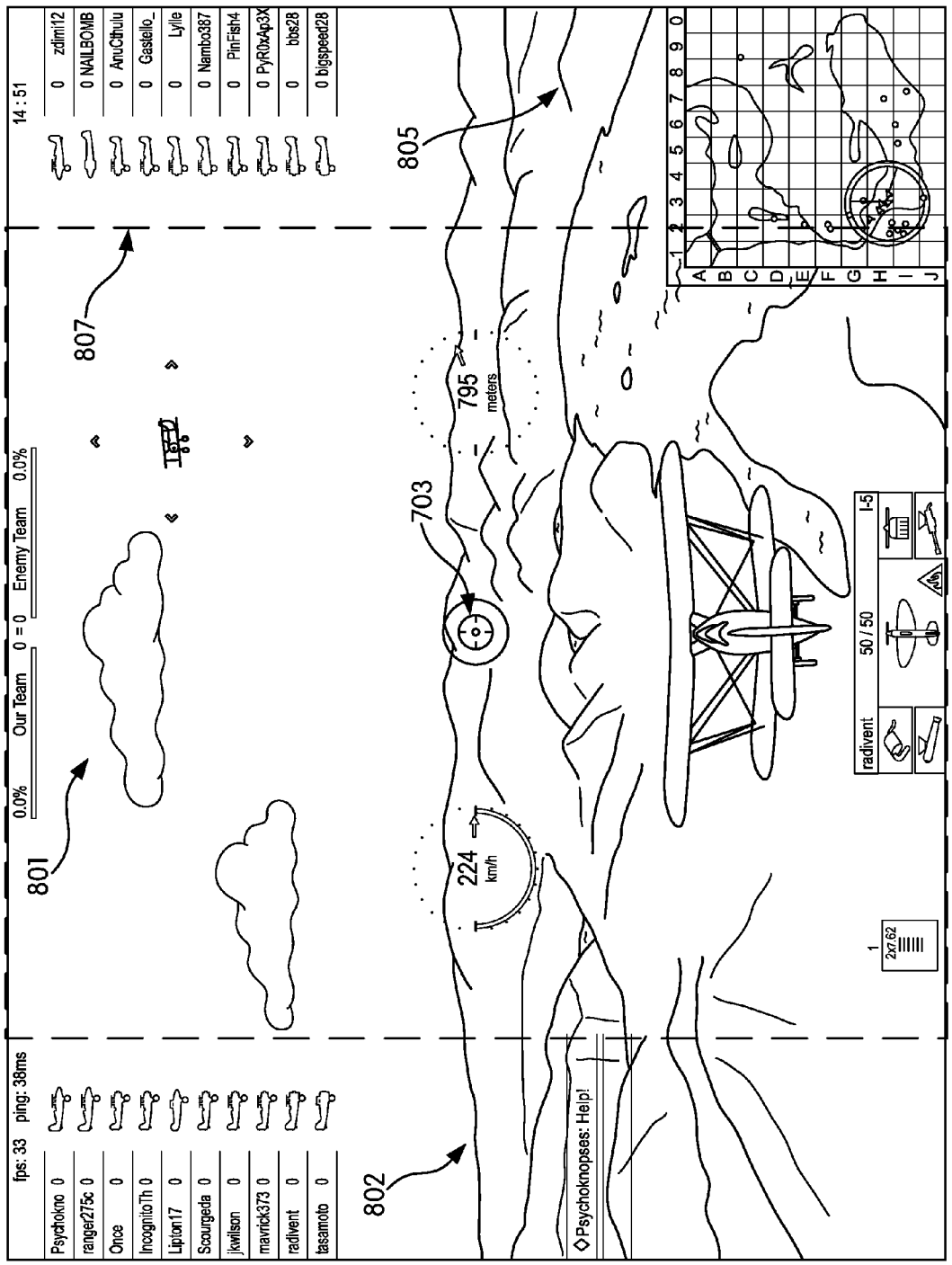
FIGS. 8A-8B illustrate control regions that may be used according to one or more aspects described herein.

According to some aspects, cue 707 may be defined by a predetermined area of the display, or beyond a predetermined distance from an initial or default position, e.g., from reticle 704. In FIG. 8A, Cue 807 represent the boundary between destination-based control area 801 and direction-based rotation areas 802 and 805. Cue 707 may or may not be visible on the display screen. The location and visibility of boundary 807 may be fixed for all modes of game play, or may be variable depending on, as illustrative examples, global or local user preferences, type of vehicle controlled, attribute of vehicle controlled, attribute of character controlled, or defined based on game play or some other dynamic. Of course, boundary lines need not be shown on the display. When the directional input indicator 703 is positioned in destination-based rotation area 801, the vehicle may rotate as described above using destination-based control. However, if the user moves the directional input indicator 703 to direction-based rotation area 802 or 805, continuous rotation in the respective direction may begin, based on the relative location of input indicator 703.

Figure 8B:
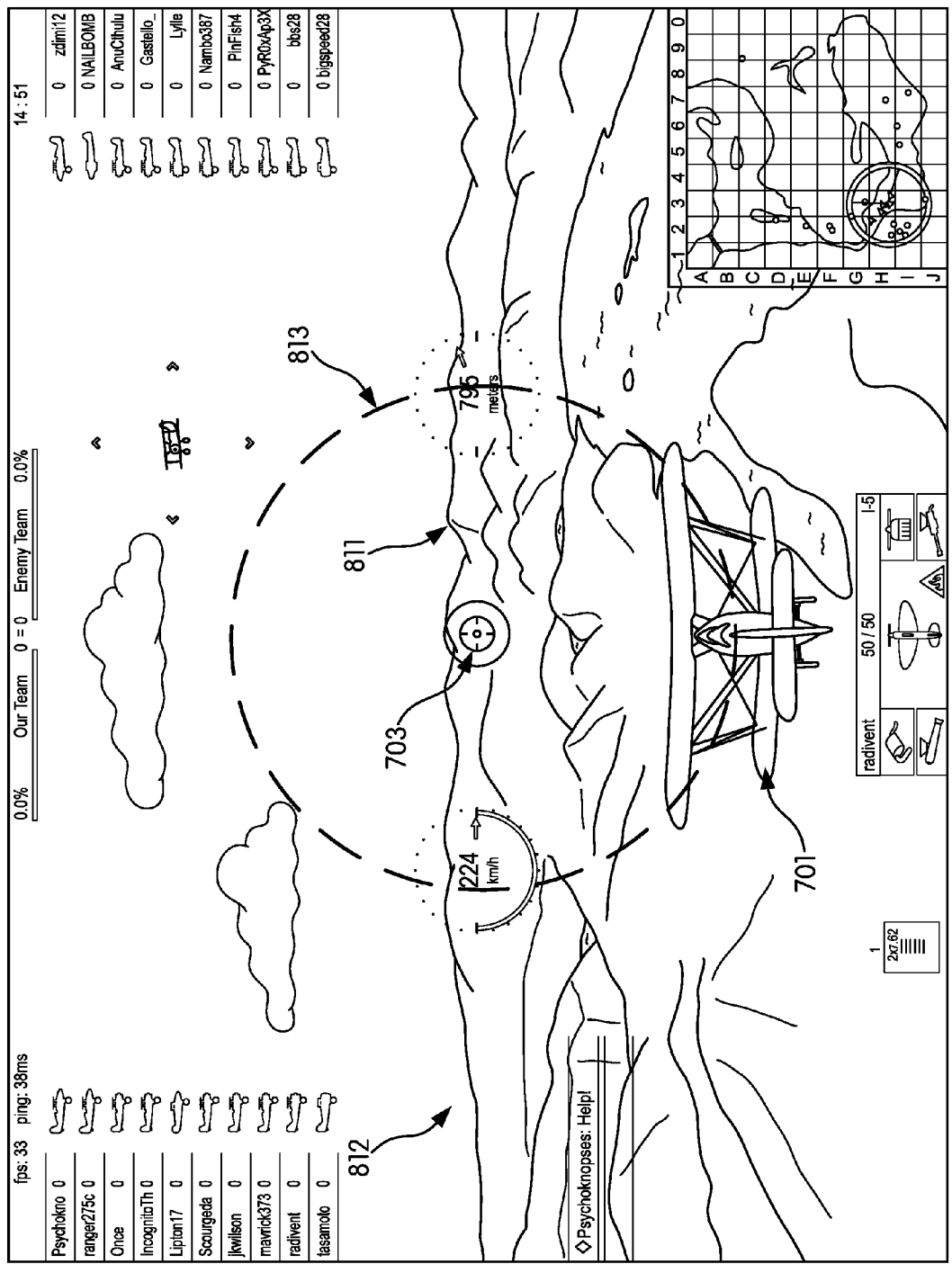

Directional input indicator 703 may change appearance to notify the user whether destination-based or direction-based input mode is active. For example, directional input indicator 703 may change from a circle to a small arrow (or a small arrow within a circle, or some other visual cue), or vice versa. To end continuous rotation, the user may provide new input to move the directional input indicator 703 from rotation area 802 or 805 into rotation area 801. Directional input indicator 703 may revert to an original appearance or presentation to notify the user that direction-based rotation has ended. FIG. 8B shows an alternative embodiment having a circular boundary cue 813 (e.g., a larger version of visual cue 707) between destination-based rotation area 811 and direction-based rotation area 812. In such embodiment, the user may move the directional input indicator 703 from rotation area 811 to rotation area 812 to begin continuous rotation of the vehicle using direction-based input. Other alternative arrangements of the boundary, such as having an ellipsoidal, square, or rectangular shape, may also be used.

The directional input, or direction of rotation, and the speed of rotation can be said to form a motion vector. To move the vehicle in accordance with this motion vector, data elements comprising this motion vector are transmitted to an artificial intellect (AI) engine. This AI may be distributed among various modules within video game software 401, operating alone or in connection with world game server 300. Of course, it may also be centralized to any individual module or component within video game software 401. Other input data may also be transmitted to the artificial intellect. Other input data may include, as illustrative but non-exhaustive examples, the speed of the vehicle relative to the ground, or indicators of damage to the vehicle caused by collisions with in-game objects or successful hits by opposing players.

As mentioned above, the motion vector along with the other input data may form the basis of various calculations regarding the movement of the vehicle. These calculations may result in the required roll, pitch, and yaw of the vehicle in three-dimensional space necessary to effect the desired movement of the vehicle in accordance with the motion vector. The AI then operates the vehicle's simulated control equipment in accordance with a realized flight-model and the combination of preset characteristics and variable characteristics of the vehicle in order to perform a maneuver. For example, this control equipment may include flaps, ailerons, elevators, control vanes, rudders, and so on. Vehicle characteristics may include those visible to the player, such as mass or engine power, as well as those not visible to the player, such as airfoil design, air temperature, and/or air pressure. Vehicle characteristics may also be dependent on game play rules or attributes of the video game, such as the particular map or battle mode.

According to some aspects, once the rotation of the vehicle is accomplished, the AI may automatically "level out" the vehicle. For example, if the vehicle is a fixed-wing aircraft, the AI may operate the vehicle's control equipment so that the wings of the aircraft will become level. As a result, after rotation of the aircraft is completed, the aircraft will travel in a straight line in the direction displayed by the up-to-the-minute indicator.

Figure 9:
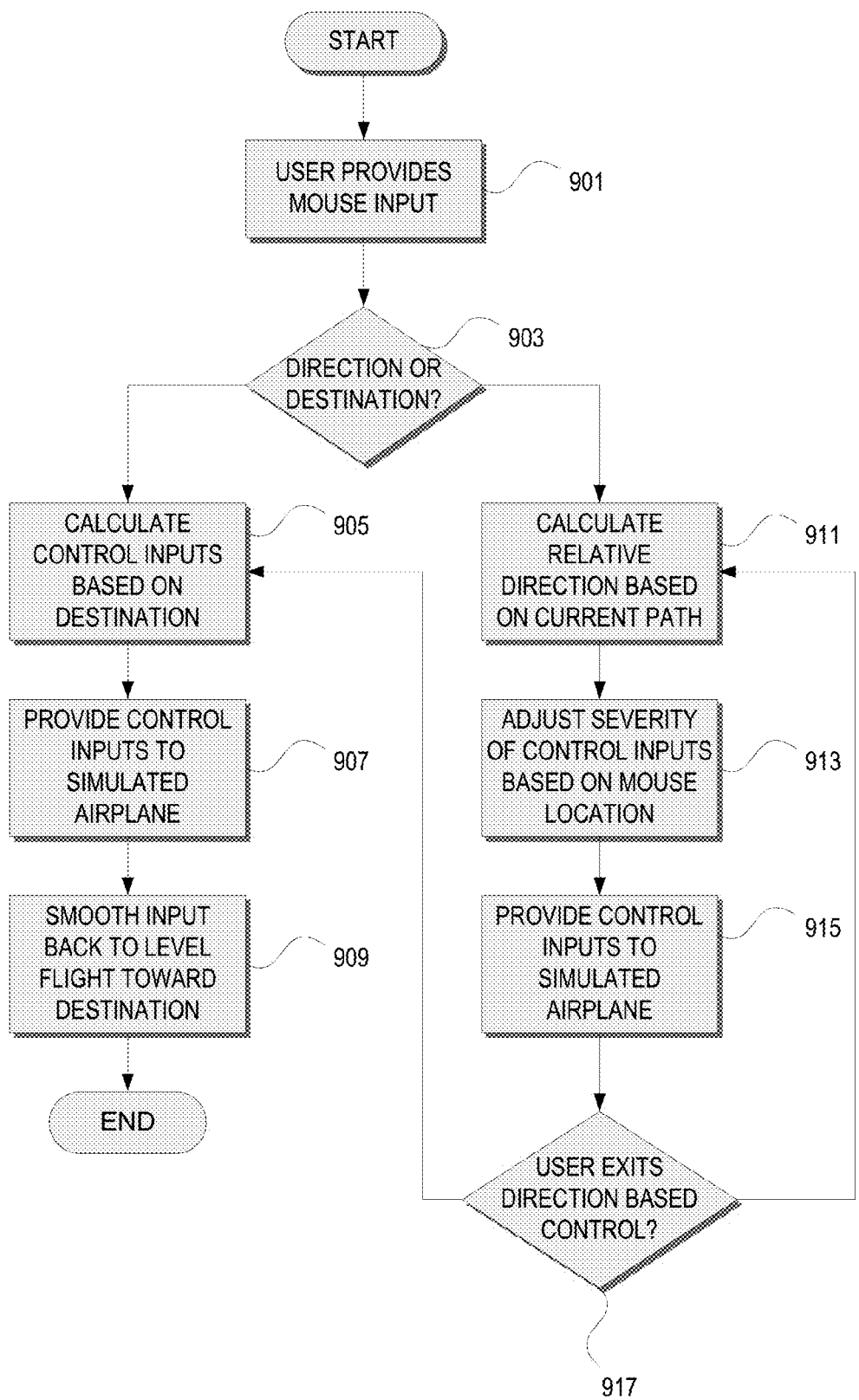
FIG. 9 illustrates a method for controlling a vehicle within a simulated three dimensional environment according to one or more aspects described herein.

With reference to FIG. 9, software and/or hardware may perform a method for controlling a vehicle using two modes of input: destination-based input and direction-based input. Initially, in step 901, the software receives mouse-based input from the user (other two-dimensional input devices may be used). As shown in FIG. 8B, when a user provides mouse input to alter a course of vehicle, mouse pointer 703 will be positioned either within destination-based input area 811 or direction based input area 812. In step 903 the system determines which of the two areas mouse pointer 703 is in, and proceeds accordingly. If mouse pointer 703 is in destination based area 811, then in step 905 the system determines the location identified by mouse pointer 703 and calculates the necessary control inputs on simulated airplane 701 to alter course of airplane 701 to result in a flight heading toward the destination identified by mouse pointer 703. In step 907 the system applies the calculated inputs on simulated airplane 701. In step 909 the system may gradually reduce the inputs to prove a smooth transition back to straight and/or level flight toward the destination, so as to avoid a jerky motion as the user is viewing the display screen. Once the plane has returned to straight and/or level flight, the method ends until the user provides subsequent mouse input.

If the user moves the mouse until point 703 is in direction-based control area 812, then in step 911 the system calculates a relative direction based on the location of mouse pointer 703 relative the directional vector of travel of the airplane 701. In step 913 the system may magnify or reduce the calculated control inputs based on the distance of mouse point 703 from reticle 704. For example, a user moving pointer 703 farther away from reticle 704 may indicate a desire to turn faster than when pointer 703 is closer to the boundary 813 between regions 811 and 812. In step 915 the system applies the control inputs to simulated plane 701 to turn in the desired direction. In step 917 the system determines whether the user has moved pointer 703 out of region 812 and back into region 811. If so, the method returns to step 905 to handle the destination based input as described above. If not, the method returns to step 911 to continue direction-based control based on a then current position of mouse pointer 703.

Figure 10:
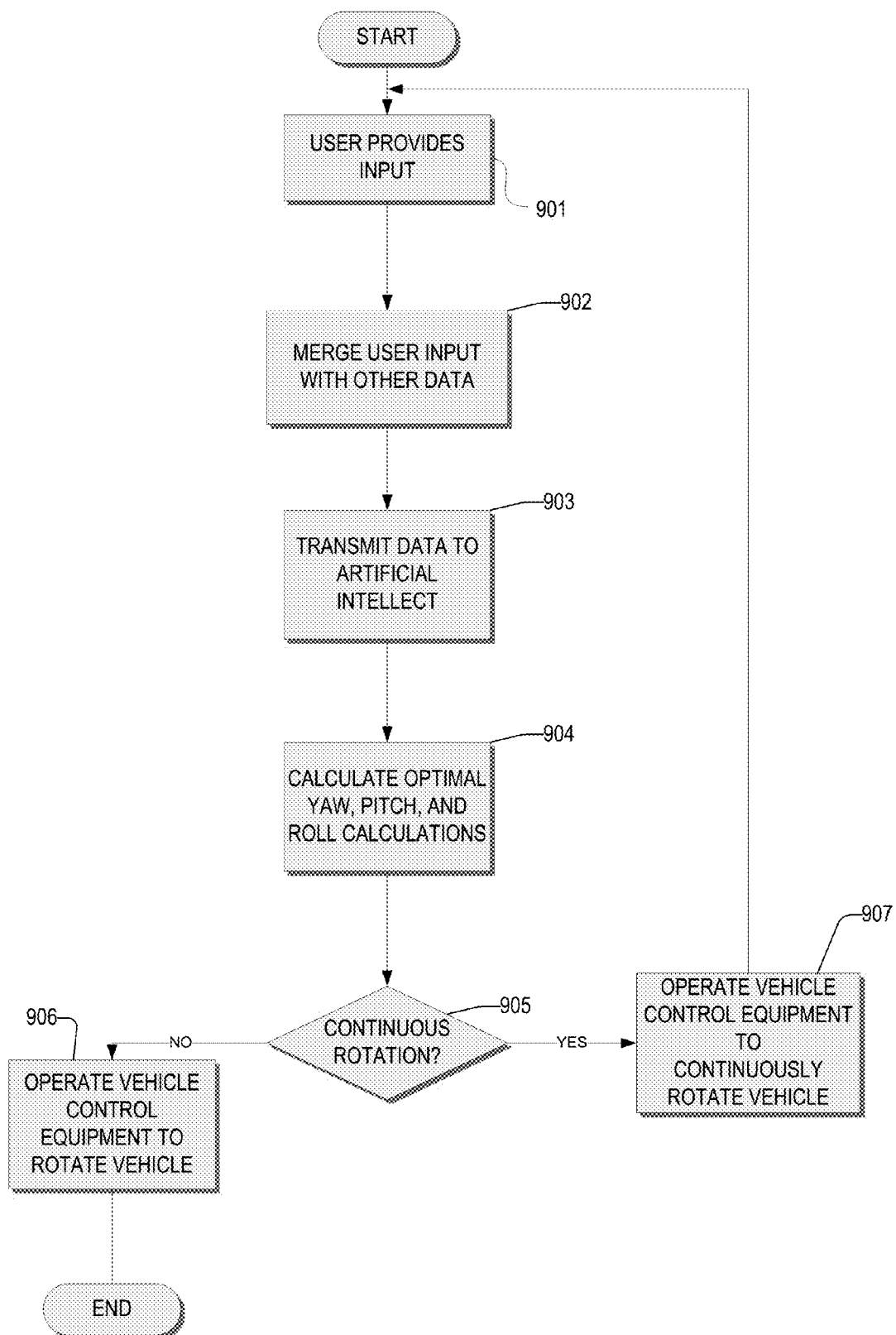
FIG. 10 illustrates a method for controlling a vehicle within a simulated three dimensional environment according to one or more aspects described herein.

FIG. 10 provides an illustrative example of how movement of the vehicle may occur as a result of directional based control flight calculations. In step 1001, the player provides input using the mouse representing a new motion vector the player wishes the vehicle to pursue (e.g., using direction-based input). In step 1002, other input data is acquired (e.g., the speed of the vehicle relative to the ground, or indicators of damage to the vehicle caused by collisions with in-game objects or successful hits by opposing players). In step 1003, the aggregated data is transmitted to the artificial intellect. In step 1004, the artificial intellect calculates the optimal roll, pitch, and yaw rotations for the vehicle. In step 1005, the artificial intellect determines, based on the user input, if continuous rotation is desired. If not, the artificial intellect operates in step 1006 the vehicle control equipment to achieve the calculated rotations from step 1004. If continuous rotation is desired, however, the artificial intellect operates the vehicle control equipment in step 1007 to achieve the continuous rotations until new input ending continuous rotation mode is provided by the user.

It will be appreciated that steps of the above-described methods may be rearranged, altered, removed, or split into more details or levels of granularity. The specific implementation details are secondary to the ability to provide users both directional and destination based control. For example, in one alternative embodiment, the entire screen may be a destination based input area. However, any time the user moves the mouse, the destination may reset to the new mouse location. Thus, as an airplane is turning, the user may continue to drag the mouse, in essence "fighting" against the system as it slowly moves the mouse pointer 703 toward reticle 704 as the plane turns toward the last identified destination.

The present aspects have been described in terms of preferred and exemplary embodiments thereof. Numerous other embodiments, modifications and variations within the scope and spirit of the appended claims will occur to persons of ordinary skill in the art from a review of this disclosure.

What is claimed is:

1. One or more tangible computer readable media storing instructions that, when executed by a data processing device, cause the data processing device to:
   render a simulated three dimensional graphical environment for output to a display screen;
   control a moving vehicle within the three-dimensional graphical environment based on user input controlling a location of a two-dimensional input device;
   determining whether the location is within one of a first input area of a display screen and a second input area of the display screen;
   responsive to determining the location is within the first input area of the display screen, using destination-based control to alter a course of the vehicle to a heading in line with a destination identified by the location of the two-dimensional input device; and
   responsive to determining the location is within the second input area of the display screen, using direction-based control to alter the course of the vehicle in a direction identified by the location of the two-dimensional input device without an identified destination.

2. The computer readable media of claim 1, wherein the vehicle is an airplane.

3. The computer readable media of claim 1, wherein the vehicle is a tank.

4. The computer readable media of claim 1, wherein the vehicle is a battleship.

5. The computer readable media of claim 1, wherein the direction is based on a location of the two-dimensional input device relative to a targeting reticle of the vehicle.

6. The computer readable media of claim 1, wherein the first input area consists of the entire display screen.

7. The computer readable media of claim 5, wherein the first input area consists of the interior area of a circle around a targeting reticle associated with the vehicle, and the second input area consists of a portion of the display screen outside the circle.

8. The computer readable media of claim 5, wherein the destination-based control comprises altering a turn rate based on a distance of the location of the two-dimensional input device from the targeting reticle.

9. The computer readable media of claim 1, wherein the destination-based control comprises applying a smoothing function to control inputs as the vehicle approaches the identified destination.

10. A method comprising:
rendering a simulated three dimensional graphical environment for output to a display screen;
controlling a moving vehicle within the three-dimensional graphical environment based on user input controlling a location of a two-dimensional input device;
determining whether the location is within one of a first input area of a display screen and a second input area of the display screen;
responsive to determining the location is within the first input area of the display screen, using destination-based control to alter a course of the vehicle to a heading in line with a destination identified by the location of the two-dimensional input device; and
responsive to determining the location is within the second input area of the display screen, using direction-based control to alter the course of the vehicle in a direction identified by the location of the two-dimensional input device without an identified destination.

11. The method of claim 10, wherein the vehicle is an airplane.

12. The method of claim 10, wherein the vehicle is a tank.

13. The method of claim 10, wherein the vehicle is a battleship.

14. The method of claim 10, wherein the first input area consists of the entire display screen.

15. The method of claim 10, wherein the direction is based on a location of the two-dimensional input device relative to a targeting reticle of the vehicle.

16. The method of claim 15, wherein the first input area consists of the interior area of a circle around a targeting reticle associated with the vehicle, and the second input area consists of a portion of the display screen outside the circle.

17. The method of claim 15, wherein the destination-based control comprises altering a turn rate based on a distance of the location of the two-dimensional input device from the targeting reticle.

18. The method of claim 10, wherein the destination-based control comprises applying a smoothing function to control inputs as the vehicle approaches the identified destination.

19. A method comprising:
receiving user input identifying a location of a two-dimensional input device;
determining whether the location is within one of a first input area of a display screen and a second input area of the display screen;
responsive to determining the location is within the first input area of the display screen, using destination-based control to alter a course of a vehicle in a simulated three dimensional environment depicted on the display screen based on a destination identified by the location of the two-dimensional input device;
responsive to determining the location is within the second input area of the display screen, using direction-based control to alter a course of the vehicle based on a direction identified by the location of the two-dimensional input device;
receiving user input defining the first input area and the second input area; and
adjusting the size of the first input area and the second input area based on the received user input.

20. A system, comprising:
a processor, and
memory storing instructions that, when executed the processor, configure the data processing device to:
divide a user interface displayed on a display screen into a first input area and a second input area, wherein said first input area consists of a region within a circle around a targeting reticle displayed on the display screen, and the first input area consists of a region outside the circle;
receive user input positioning a mouse on the display screen;
determine whether a location of the mouse is within one the first input area of a display screen and a second input area of the display screen;
responsive to determining the mouse location to be within the first input area, initiate a destination-based control mode to alter a course of an airplane in a simulated three dimensional environment depicted on the display screen based on a destination identified by the mouse location, wherein the destination-based control mode comprises applying a smoothing function as the vehicle approaches the identified destination; and
responsive to determining the mouse location is within the second input area of the display screen, initiate a direction-based control mode to alter the course of the airplane based on a relative direction of the mouse location from a targeting reticle.

* * * * *